(12) United States Patent
Huang et al.

(10) Patent No.: US 7,526,376 B2
(45) Date of Patent: Apr. 28, 2009

(54) IN-VEHICLE DETERMINATION OF THE RELATIVE CENTER OF GRAVITY HEIGHT

(75) Inventors: Jihua Huang, Sterling Heights, MI (US); William C. Lin, Birmingham, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/563,251

(22) Filed: Nov. 27, 2006

(65) Prior Publication Data

US 2007/0129867 A1    Jun. 7, 2007

Related U.S. Application Data

(60) Provisional application No. 60/742,123, filed on Dec. 2, 2005.

(51) Int. Cl.
*B60G 21/067* (2006.01)

(52) U.S. Cl. .......................... 701/124; 701/36; 701/38; 701/65; 701/72; 180/172; 180/282; 180/290; 180/271; 340/440; 340/443; 702/173; 702/174; 702/175

(58) Field of Classification Search .................. 701/36, 701/38, 65, 72, 124; 340/440, 443; 180/172, 180/282, 290, 271
See application file for complete search history.

(56) References Cited

U.S. PATENT DOCUMENTS

| | | | | |
|---|---|---|---|---|
| 5,825,284 | A * | 10/1998 | Dunwoody et al. | 340/440 |
| 5,973,273 | A * | 10/1999 | Tal et al. | 177/1 |
| 6,263,261 | B1 * | 7/2001 | Brown et al. | 701/1 |
| 6,324,446 | B1 * | 11/2001 | Brown et al. | 701/1 |
| 6,424,907 | B1 * | 7/2002 | Rieth et al. | 701/124 |
| 6,968,921 | B2 * | 11/2005 | Turner et al. | 180/446 |
| 7,027,903 | B2 * | 4/2006 | Meyers et al. | 701/38 |
| 7,109,856 | B2 * | 9/2006 | Lu et al. | 340/440 |
| 7,263,436 | B2 * | 8/2007 | Verhagen et al. | 701/124 |
| 2002/0056582 | A1 * | 5/2002 | Chubb et al. | 180/197 |
| 2004/0064246 | A1 * | 4/2004 | Lu et al. | 701/124 |
| 2004/0199314 | A1 * | 10/2004 | Meyers et al. | 701/38 |
| 2006/0178808 | A1 * | 8/2006 | Wu et al. | 701/124 |
| 2006/0276944 | A1 * | 12/2006 | Yasui et al. | 701/37 |
| 2007/0129867 | A1 * | 6/2007 | Huang et al. | 701/38 |

* cited by examiner

*Primary Examiner*—Thomas G Black
*Assistant Examiner*—Wae Louie

(57) ABSTRACT

Relative center of gravity height in a motor vehicle changes from a nominal value to an actual value depending upon vehicle loading. Method and apparatus for determining actual relative center of gravity height are disclosed.

19 Claims, 5 Drawing Sheets

IN-VEHICLE DETERMINATION OF THE RELATIVE CENTER OF GRAVITY HEIGHT

CROSS REFERENCE TO RELATED APPLICATIONS

This application claims the benefit of U.S. Provisional Application No. 60/742,123 filed Dec. 2, 2005.

TECHNICAL FIELD

The present invention is related to road vehicle dynamics. More particularly, the invention is concerned with in-vehicle determination of quasi-static parameters useful in vehicle rollover mitigation controls.

BACKGROUND OF THE INVENTION

Various sensing techniques have been suggested and employed for detecting incipient vehicle rollover including acceleration sensors operative on three axes, tilt sensors, level-gage and gravitation sensors. Micromechanical yaw and acceleration sensors are most commonly employed. Airbag triggering controls are adaptable for such sensing functions and are commonly utilized in rollover occupant protection systems to deploy, for example, extendable rollover bars and head airbags, and to trigger seat-belt tensioners.

Micromechanical yaw and acceleration sensors are also adaptable for use in rollover warning/mitigation controls which are intended to alert the operator of an incipient rollover or to take corrective actions to prevent the vehicle from turning over. Mitigation controls may utilizing various powertrain, steering, braking and suspension sub-systems. Generally, such warning/mitigation controls are influenced by the vehicle's lateral acceleration limits in accordance with the vehicle's characteristics which are determined by factors including center of gravity, track, mass, tire and road surface dynamics, etc.

The relative center of gravity height, i.e., the height of the center of gravity of the sprung mass relative to the roll center, has been shown to be a critical parameter in vehicle roll motion. Nominal values for a vehicle's relative center of gravity height can be readily determined. However, the actual relative center of gravity deviates from nominal in static and dynamic ways. For example, vehicle loading conditions generally effect a static change in the relative center of gravity. Static changes may be particularly acute in sport utility vehicle, trucks and vans. And, when a vehicle exhibits roll, the roll center of the sprung mass moves. Such motion introduces a dynamic change in the relative center of gravity height.

Deviation of the actual relative center of gravity from nominal will influence the performance of rollover warning/mitigation controls based on nominal relative center of gravity. Therefore, it is desirable to adapt rollover mitigation controls to such deviations. Hence, determination of the actual relative center of gravity of a vehicle is desirable.

SUMMARY OF THE INVENTION

The present invention achieves in-vehicle determination of the relative center of gravity (CG) height by considering the static change component thereof. Static changes occur when load conditions change. Therefore, it is only required that the determination occur when loading conditions change. Preferably, therefore, determination of the relative center of gravity height occurs, for example, at the beginning of a trip which may be inferred from an ignition cycle, an extended period of vehicle idle or a shift out of neutral or park, or other such indicia. Alternative, non-limiting initiation indicators for determination of the relative center of gravity height may include, for example, changes in vehicle loading inferred from road or engine load, or from changes in suspension loading inferred from damper sensors or the like.

A method for determining relative center of gravity height in a vehicle in accordance with the invention includes detecting a vehicle roll condition and estimating relative center of gravity height based on data collected during the vehicle roll condition.

These and other aspects of the invention will become apparent to those skilled in the art upon reading and understanding the following detailed description and drawings of certain exemplary embodiments.

DESCRIPTION OF THE PREFERRED EMBODIMENT

Figure 1:
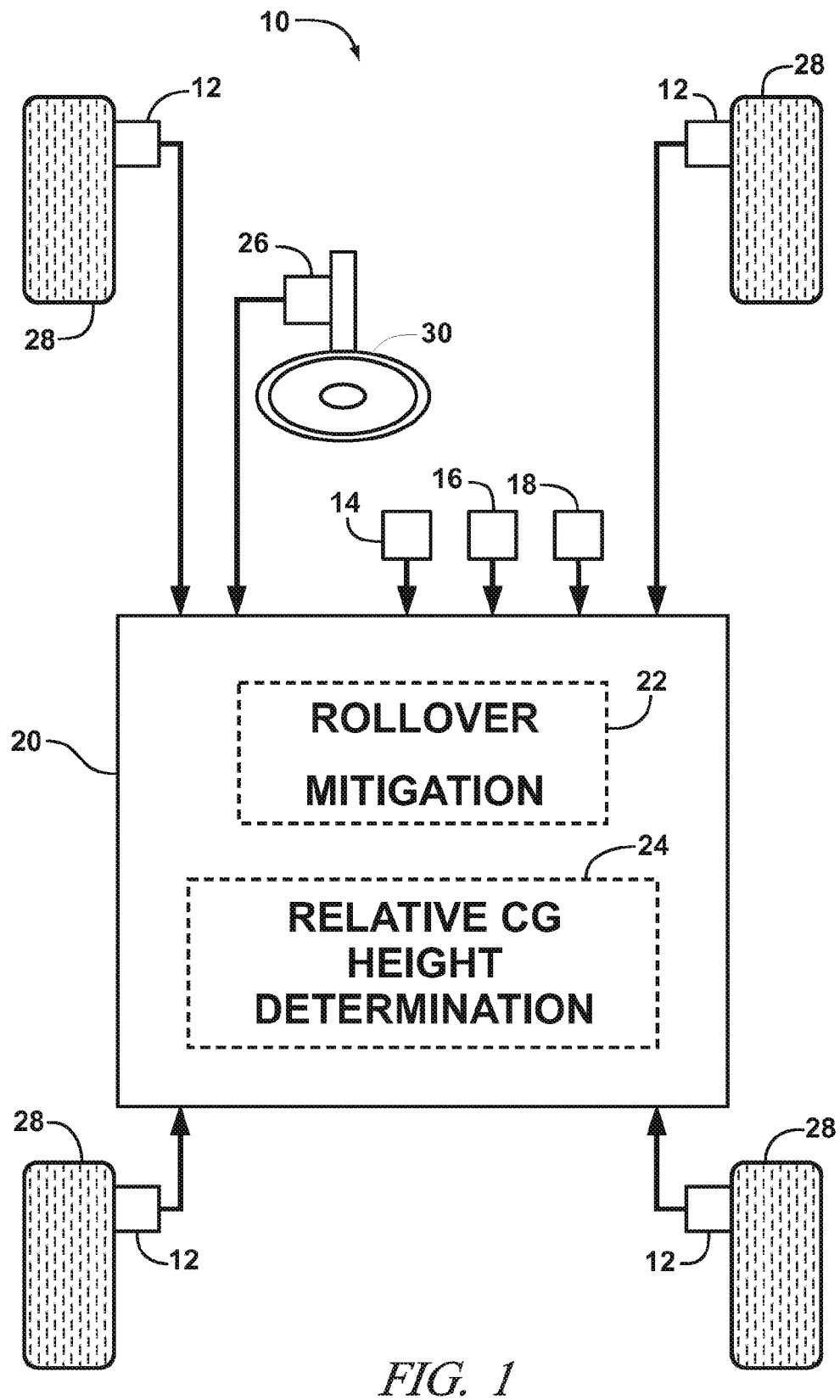
FIG. 1 illustrates a schematic diagram of a vehicle adapted for determination of the relative center of gravity height in accordance with the present invention.

Referring first to FIG. 1, a schematic diagram of a vehicle 10 is shown. The vehicle 10 has four wheels 28 and is adapted for in-vehicle determination of the relative center of gravity height in accordance with the present invention. Vehicle 10 is equipped with a steering wheel 30 and a plurality of sensors useful for rollover mitigation control including, for example, steering angle sensor 26, a lateral accelerometer 14, a yaw gyro 16, a roll gyro 18, and individual wheel speed sensors 12. All of the sensors are input to general purpose computer based automotive controller 20, preferably comprising one or more vehicle dynamics control units adapted for vehicle stability enhancements The control units may comprise general-purpose digital computers comprising a microprocessor or central processing unit, read only memory (ROM), random access memory (RAM), electrically programmable read only memory (EPROM), high speed clock, analog to digital (A/D) and digital to analog (D/A) circuitry, input/output circuitry and devices (I/O) and appropriate signal conditioning and buffer circuitry. Each control unit has a set of control algorithms, comprising resident program instructions and calibrations stored in ROM. In the present example, controller includes relative center of gravity height determination algorithms and functionality 24 and preferably vehicle state estimation and/or vehicle control algorithms 22, including for example rollover mitigation controls.

Figure 2:
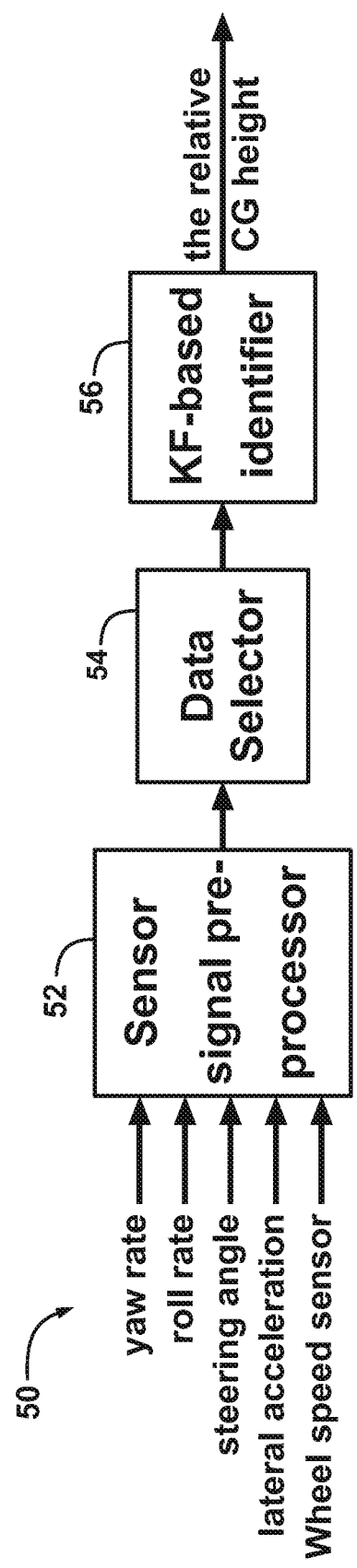
FIG. 2 illustrates a high-level block diagram illustrating exemplary tasks for in-vehicle determination of the relative center of gravity height in accordance with the present invention.

FIG. 2 illustrates a high-level block diagram illustrating exemplary tasks for in-vehicle determination of the relative center of gravity height in accordance with the present invention. The determination process comprises three parts conditioned to function as further described herein below with respect to FIG. 3. A sensor signal pre-processor 52 takes in the measurements from the various sensors 50 described herein above, removes sensor biases, reduces sensor noises and otherwise conditions the sensor signals as required. A data selector 54 chooses and collects portions of data that are suitable for the determination of the relative center of gravity height. A Kalman filter-based (KF-based) identifier 56 estimates the relative center of gravity height based on the collected data.

Figure 3:
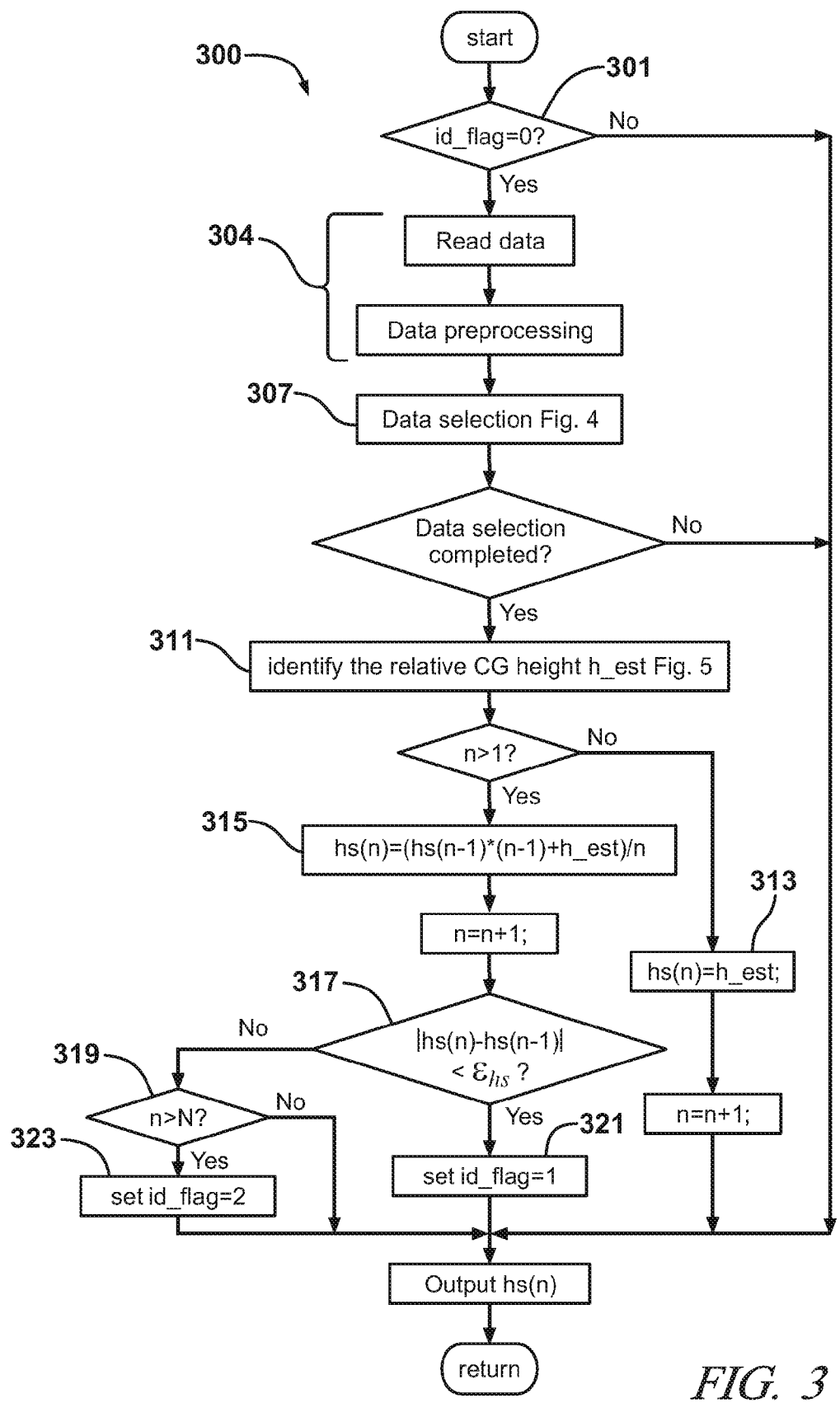
FIG. 3 illustrates an exemplary routine for carrying out determination of the relative center of gravity height in accordance with the present invention.

With additional reference now to FIG. 3, an exemplary routine <300> for carrying out determination of the relative center of gravity height in accordance with the present invention is illustrated. An initialization process is executed before this routine proceeds. The initialization process sets a variable, id_flag, to 0; a counter, n, to 1; and an initial value for the estimate of the relative center of gravity height, hs(1), to its nominal value $hs_{nominal}$. Preferably, $hs_{nominal}$ is provided from a calibration value. The processing procedure in FIG. 3 starts with checking whether id_flag=0 <301>. If so, the determination has not been completed and the determination process continues with reading and pre-processing sensor signals <304>. Next, the data selector determines and stores the qualified data for the determination <307>, as further described herein below in conjunction with FIG. 4. Upon receiving a complete portion of qualified data from the data selector, the KF-based identifier estimates the relative CG height and outputs the result as h_est, as further described herein below in conjunction with FIG. 5. If the result is the first instance determination result, i.e., n=1, the result sets hs(1) to the newly identified value of the relative CG height, h_est <313>. Otherwise, the result will be averaged with the previous determination results to form a new estimate <315>. The update of the estimate can be summarized by the following relationship:

$$hs(n) = \frac{hs(n-1) \times (n-1) + h\_est}{n}, \quad (n > 1), \quad (1)$$

The determination is complete under either of two situations. First, if the new estimate hs(n) is very close to the previous estimate hs(n−1), then the determination is complete <317>. In other words, as shown in FIG. 3, if |hs(n)−hs(n−1)|<$\epsilon_{hs}$, where $\epsilon_{hs}$, is a predefined threshold, then the determination is complete. A preferred value for $\epsilon_{hs}$ may be 1% to 5% of the vehicle's calibration $hs_{nominal}$. Second, the determination may be assumed complete after a predetermined duration as measured, for example, by passage of time or a number of determination routine executions. For example, as shown in FIG. 3, determination of the relative CG height is assumed complete after a predetermined number N of routine executions <319>.

To differentiate these two completion situations a flag, id_flag is set to 1 if the threshold comparison determines completion <321> and set to 2 if a duration comparison determines completion. Once completed, i.e., id_flag≠0, the determination process will directly retrieve the identified value hs(n) without processing any new data. Otherwise, id_flag remains 0; therefore, as the next roll motion occurs, the identification will be executed with n >1 and hs(n) from the previous identification process.

Figure 4:
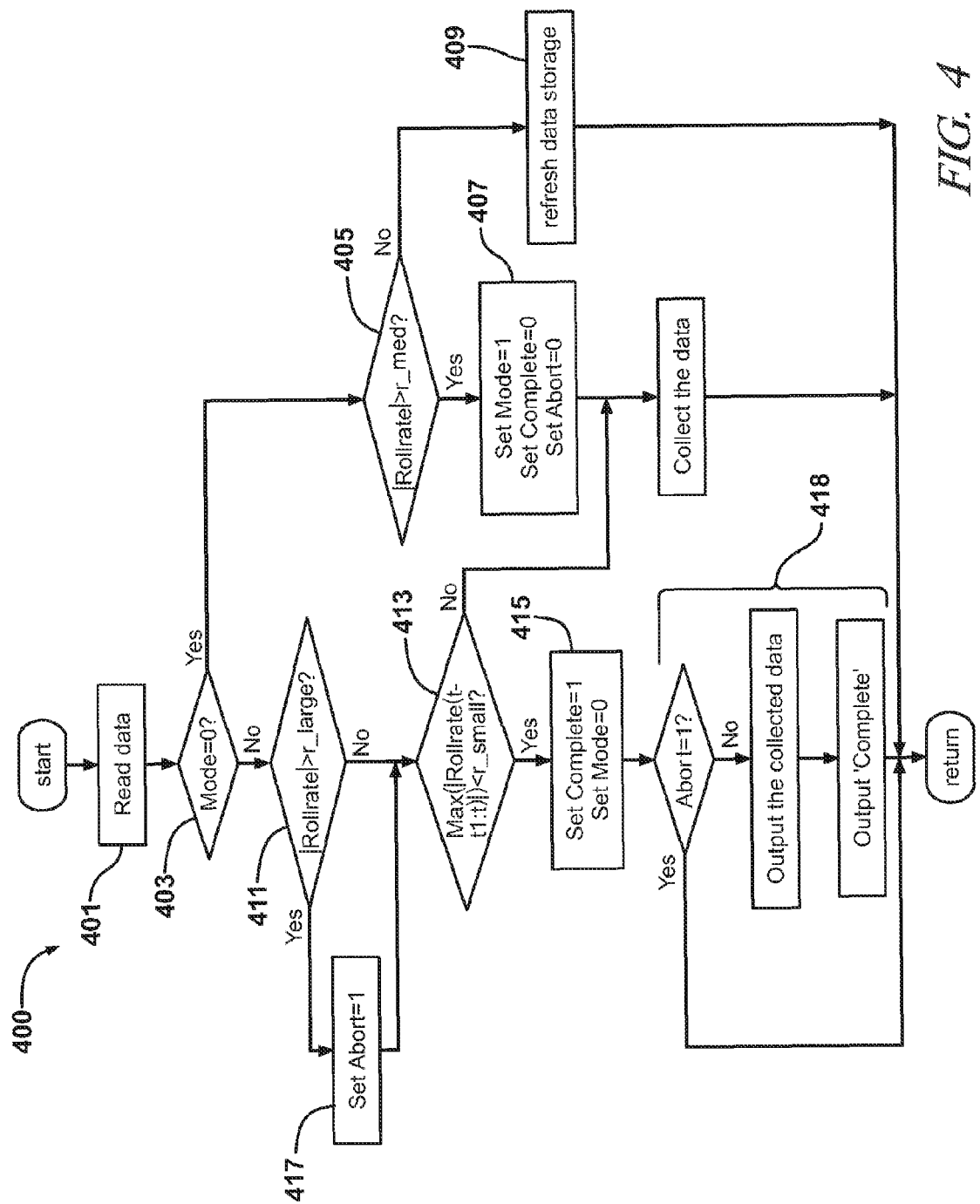
FIG. 4 illustrates in additional detail an exemplary data selection routine for carrying out determination of the relative center of gravity height in accordance with the present invention.

Referring now to FIG. 4, an exemplary data selection routine <400> is illustrated. The data selection routine is to choose and collect data that is suitable for reliable determinations of the relative center of gravity height. Data associated with relatively large roll motions will have the required qualifications and robustness. The data selector determines the qualified data based on vehicle roll rate. To maintain the data integrity of an associated roll motion, a certain amount of data before and after the large roll motion is also preferably acquired. Thus, the selector acquires and stores data for a certain duration flanking the large roll motion.

As further detailed in FIG. 4, the data selector begins with reading the processed data from the sensor signal pre-processor <401>. The data selector then proceeds according to its operation states denoted by a variable Mode which is initialized at zero <403>. If Mode equals zero, then the selector is not presently collecting data. The selector then determines if the newly-read data is qualified based on the roll rate. This is done, for example, by comparing the vehicle roll rate (|rollrate|) to a predefined first rollrate threshold (r_med) <405>. Preferably, r_med is provided from a calibration value. A preferred value for r_med may be about 5 degrees/second. If |rollrate| exceeds r_med then the selector routine sets Mode=1 and variables Complete and Abort to zero <407>. The variables Complete and Abort will be discussed in further detail herein below. Mode=1 signifies data collection is active. If however |rollrate| does not exceed r_med then the selector routine refreshes its data storage to prepare for the next large roll motion <409>.

If Mode does not equal zero at <403>, then the selector is operating in the data-collecting mode. In the data-collecting mode, if the vehicle rollrate is not excessive with respect to a predefined second rollrate threshold (r_large) <411>, the selector determines if the vehicle roll motion has settled by checking if the vehicle roll rate |rollrate| is within a predefined third rollrate threshold (r_small) during the last t1 seconds, for example t1 equal to about 1 second <413>. This is accomplished, for example, as shown in FIG. 4 by comparing the largest absolute value of vehicle rollrate during the last t1 seconds to a small threshold r_small, for example r_small equal to about 2 degrees/second. Where Max(|rollrate(t−t1: t)|) <r_small, the vehicle motion is assumed to have settled. If the vehicle has settled, the selector sets Complete equal to one, Mode equal to zero in preparation for the next data collection and terminates the present data collection <415>. The data thus collected corresponds to a maneuver with a relatively large roll motion. However, if the roll motion is too severe, the linear model used in the KF-based identifier will no longer represent the vehicle dynamics with sufficient accuracy. In these cases, the selector should avoid outputting the data. Therefore, the selector sets Abort equal to one whenever |rollrate| exceeds the second rollrate threshold (r_large) <417>, for example r_large equal to about 20 degrees/second. Therefore, the selector will only output the collected data if Abort equals zero <418>.

The relative center of gravity height identifier utilizes a KF-based state observer. For Kalman filtering, the output measurements are fed back via the innovation which is the error between the output measurements and the a priori output estimates. Two factors contribute to the innovation: sensor noise and model inaccuracy. Given the same sensor measurements and model structure, the more accurate the parameters are, the smaller the innovation should be. Accordingly, the identifier tries various values as the relative center of gravity height in the model and identifies the one that results in the smallest innovation (in the sense of L2-norm) as the best estimate.

Figure 5:
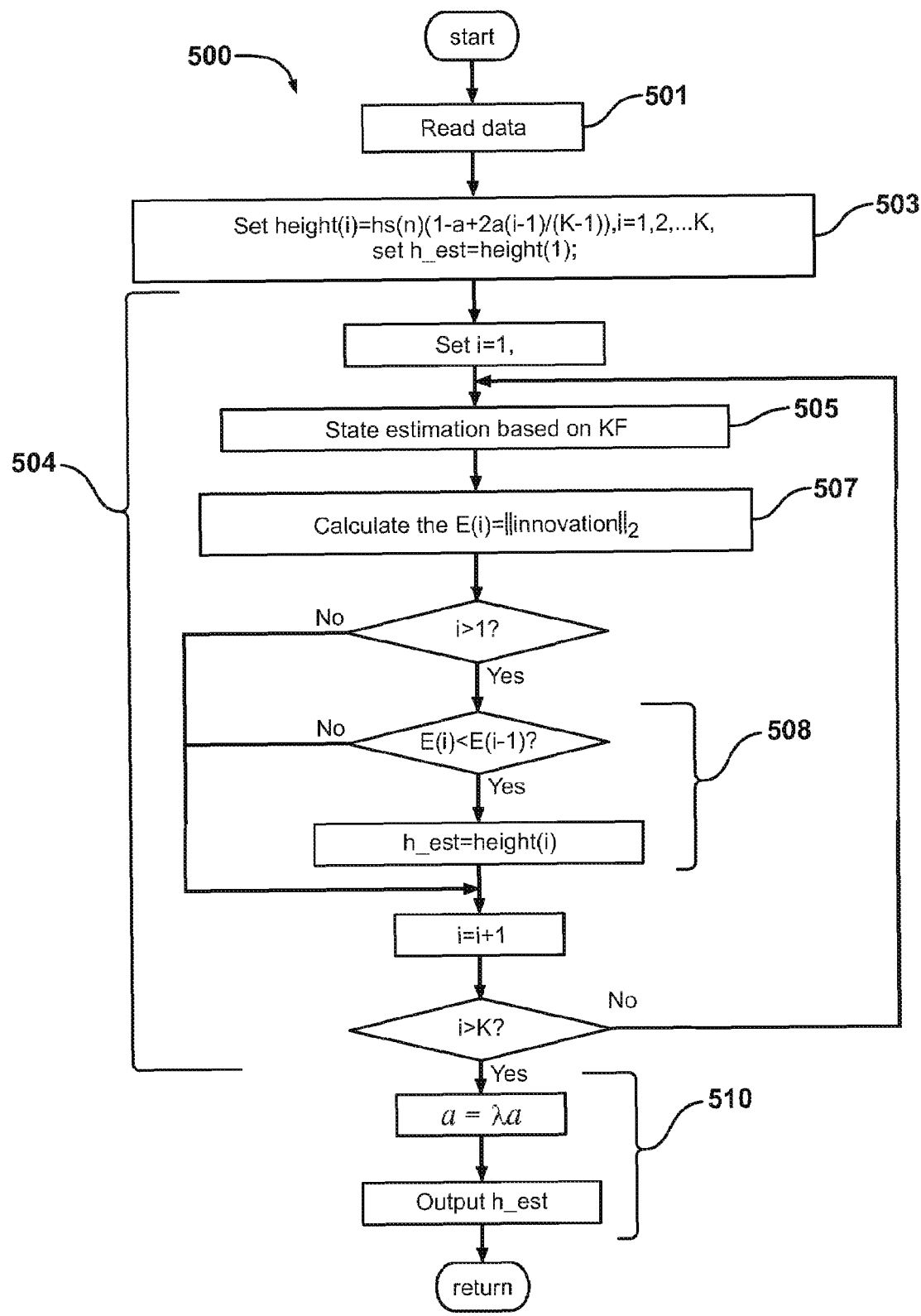
FIG. 5 in additional detail an exemplary calculation routine for carrying out determination of the relative center of gravity height in accordance with the present invention.

FIG. 5 shows an exemplary KF-based identifier routine <500> for carrying out determination of the relative center of gravity height. The identifier reads the data collected by the data selector and the current estimate of the relative center of gravity height hs(n) <501>. Using hs(n) as the nominal value, the identifier sets candidate estimates <503> as equally spaced between (1−a)hs(n) and (1+a)hs(n) as set forth below in the following relationship:

$$height\,(i) = \left(1 - a + \frac{2a}{K-1}(i-1)\right)hs(n), \quad i = 1, 2, \cdots, K \quad (2)$$

where (0<a<1) determines the searching range, and K is the number of candidates to be evaluated. The identifier then starts a loop <504> to evaluate each of the candidate estimates. During each evaluation, a candidate estimate is used as the relative center of gravity height in the system matrices;

vehicle states are estimated based on Kalman filtering techniques <505> and the L2-norm of the corresponding innovation is calculated <507>. For example, the vehicle states include vehicle lateral velocity, yaw rate, roll rate and roll angle; the input to the Kalman filter is the steering angle; and the outputs are the yaw rate and the roll rate. Measurements from the yaw and roll gyros are used to correct the a priori estimates of the outputs. Therefore, the innovation is the error between the a priori estimates of the outputs and the measurements from the yaw and roll gyros. The candidate height(i) that yields the smallest innovation is rendered as the best estimate h_est <508>. The identifier outputs h_est and updates $a=\lambda a$, where ($0<\lambda\leq 1$), to reduce the searching range for the next determination <510>.

The invention has been described with specific reference to the preferred embodiments and modifications thereto. Further modifications and alterations may occur to others upon reading and understanding the specification. It is intended to include all such modifications and alterations insofar as they come within the scope of the invention.

The invention claimed is:

1. Method for determining relative CG height in a vehicle, comprising:
   monitoring a nominal relative CG height value;
   sensing vehicle roll;
   determining a plurality of CG height candidates at a plurality of instances based upon vehicle dynamics data collected during the vehicle roll; and
   estimating relative CG height based on the nominal relative CG height value and selective updates based upon the plurality of CG height candidates.

2. The method of claim 1, wherein the estimating relative CG height based on the nominal relative CG height value and selective updates based upon the plurality of CG height candidates comprises:
   initially setting the relative CG height to the nominal relative CG height value; and
   iteratively comparing and selectively updating the relative CG height to each of the plurality of CG height candidates.

3. The method of claim 2, wherein the selectively updating the relative CG height comprises:
   comparing the CG height candidate to the relative CG height; and
   qualifying the CG height candidate to update the relative CG height based upon the CG height candidate falling within a searching range of the relative CG height.

4. The method of claim 2, wherein the selectively updating the relative CG height comprises a priori application of a Kalman filter to qualify each of the plurality of CG height candidates to update the relative CG height.

5. The method of claim 1, further comprising:
   resetting the relative CG height to the nominal relative CG height value based upon an indication of vehicle load change; and
   wherein the sensing of vehicle roll is initiated upon the resetting.

6. The method for determining relative CG height in a vehicle, as claimed in claim 1 wherein sensing vehicle roll comprises sensing vehicle roll within a predetermined range.

7. The method for determining relative CG height in a vehicle as claimed in claim 1 wherein said nominal relative CG height value comprises a calibration.

8. The method for determining relative CG height in a vehicle as claimed in claim 1 wherein said nominal relative CG height value comprises a previously determined relative CG height.

9. The method for determining relative CG height in a vehicle as claimed in claim 1 wherein said method is performed at least once per ignition cycle of the vehicle.

10. The method of claim 1, wherein the sensed vehicle roll comprises measurements from yaw and roll gyros.

11. Method for determining relative CG height in a vehicle, comprising:
    monitoring a vehicle dynamics state;
    monitoring an initial value of relative CG height estimate;
    monitoring an initial state of relative CG height;
    determining a plurality of CG height candidates based on the initial value of relative CG height estimate, the initial state of relative CG height, and an initial searching range parameter for CG height candidates;
    estimating a vehicle dynamic state corresponding to the CG height candidates;
    determining innovations of each vehicle dynamics state estimate with respect to the sensed vehicle dynamics state;
    updating the value of relative CG height estimate with one of the CG height candidates corresponding to a lowest innovation of the determined innovation among all CG height candidates;
    reducing the searching range parameter for CG height candidates; and
    updating the state of relative CG height based on the initial state of relative CG height and the updated value of relative CG height estimate.

12. The method of claim 11, wherein the vehicle dynamics state comprises at least one of vehicle roll rate and vehicle yaw rate.

13. The method of claim 11, wherein the initial value of relative CG height estimate comprises a calibration.

14. The method of claim 11, wherein the initial state of relative CG height comprises a calibration.

15. The method of claim 11, wherein the vehicle dynamics state is estimated based on a Kalman filtering process.

16. The method of claim 11, wherein the state of relative CG height is updated iteratively through a plurality of instances.

17. The method of claim 11, wherein the initial value of relative CG height estimate is the value of relative CG height estimate determined in a previous estimation cycle.

18. The method of claim 11, wherein the initial state of relative CG height is the state of relative CG height determined in a previous estimation cycle.

19. Apparatus for determining relative CG height in a vehicle, comprising:
    a plurality of vehicle dynamics sensors adapted to provide vehicle dynamics data;
    a controller adapted to receive the vehicle dynamics data and including a computer readable storage medium storing computer code adapted for determining relative CG height of the vehicle based on said vehicle dynamics data, said computer code including programming to:
    monitor a nominal relative CG height value;
    sense vehicle roll;
    determine a plurality of CG height candidates at a plurality of instances based upon vehicle dynamics data collected during the vehicle roll; and
    estimate relative CG height based on the nominal relative CG height value and selective updates based upon the plurality of CG height candidates.

* * * * *